May 15, 1928.
Re. 16,968
L. GLASHOW
STEAM BOILER
Original Filed Sept. 24, 1925 2 Sheets-Sheet 1
Fig. 1,
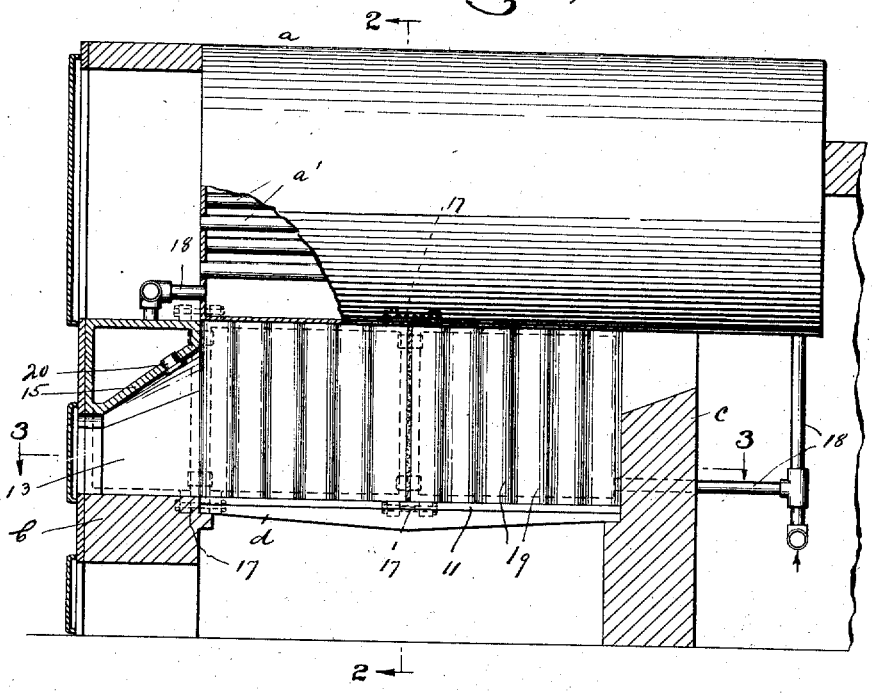
Fig. 2,
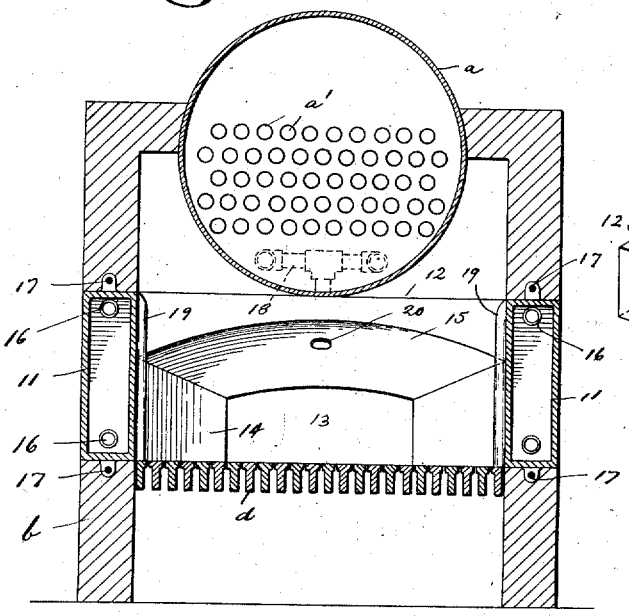
Fig. 5,
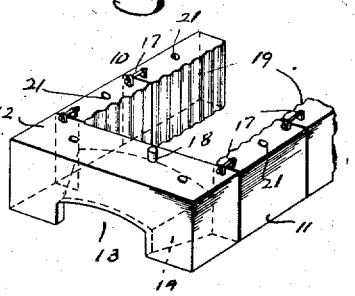
INVENTOR
Lewis Glashow
BY
Max A. Dickinson
ATTORNEY May 15, 1928.
Re. 16,968
L. GLASHOW
STEAM BOILER
Original Filed Sept. 24, 1925 2 Sheets-Sheet 2
Fig. 3,
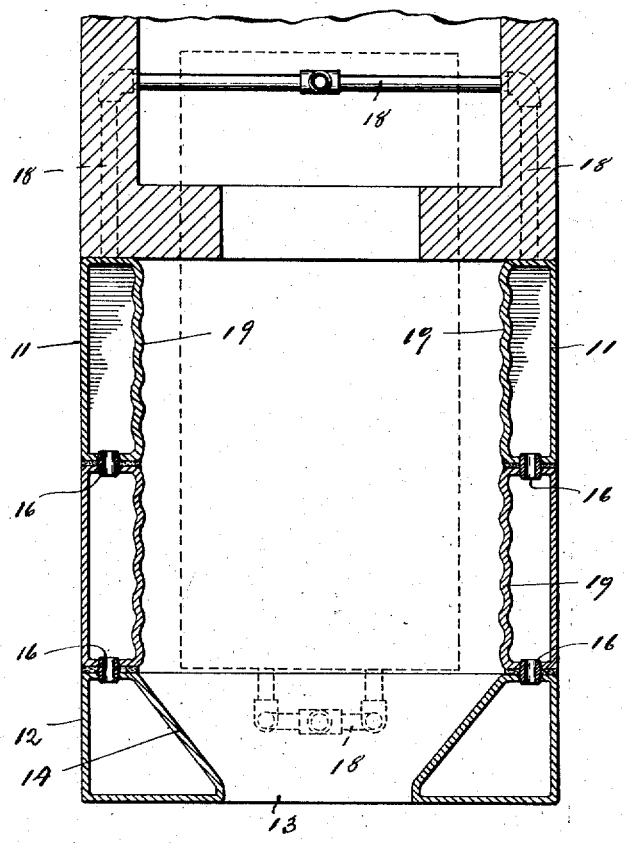
Fig. 4,
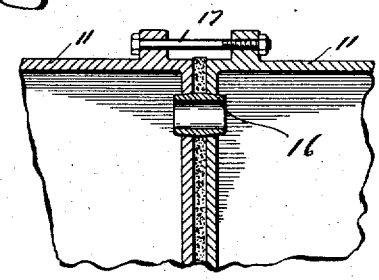
Lewis Glashow INVENTOR
BY
Marx V. Sedmacy ATTORNEY Reissued May 15, 1928. Re. 16,968

UNITED STATES PATENT OFFICE.

LEWIS GLASHOW, OF NEW YORK, N. Y.

STEAM BOILER.

Original No. 1,641,162, dated September 6, 1927, Serial No. 58,231, filed September 24, 1925. Application for reissue filed February 29, 1928. Serial No. 258,100.

The present invention relates to steam boilers and has for its object to provide means for improving the efficiency and the durability thereof.

Another object is to so construct said means that the same can be easily and conveniently installed in an existing old type boiler in which the fire box is made of bricks, without changing the general construction of the boiler and fire box thereof.

The old style boilers having brick fire boxes are still in general use. These, however, have been found to be objectionable for the reason that the brick walls and arch of the fire box absorb a considerable amount of heat and the fire box quickly burns out, requiring frequent repairs.

To remedy these evils under ordinary circumstances would require the discarding of the old boiler and the installation of a new type boiler having an all steel fire box, which, of course, would be very expensive. I have found, however, that with comparatively small expense it is possible to save the old boiler and render it very efficient and durable by simply removing the brick side walls and arch and substituting therefor a water jacket and connecting the latter to the boiler tubes and steam system, so that there is a continuous water circulation through said jacket. Thereby will the fire box, owing to the water cooling, not only be rendered very durable, but the production of steam greatly accelerated.

My invention will be understood by reference to the accompanying drawing in which similar reference characters denote corresponding parts and in which Fig. 1 is a longitudinal section of the boiler; Fig. 2 a cross-section thereof on line 2—2 of Fig. 1; Fig. 3 a longitudinal section on line 3—3 of Fig. 1; Fig. 4 a detail in section showing the connection between two sections of the casing, and Fig. 5 a perspective view of the water jacket.

In the drawing, *a* denotes the boiler proper, *a'* the tubes thereof, *b* and *c* the front and rear brick walls for the support of the fire box and of the grates *d*.

In the old structure the side walls and arch piece of the fire box are formed by bricks, which as has been heretofore stated, absorb a great deal of the heat necessary for the production of steam and quickly burn out. My invention consists in the provision of a metal fire box structure, which can be conveniently and cheaply installed into the space left vacant, after the removal of said bricks, without making any material changes in the general construction of the boiler, and whereby the aforenamed objections will be obviated.

The new fire box structure 10 in plan view is substantially U-shaped, the longitudinal parts 11 thereof serving as inner side walls of the fire box and the cross piece 12 as the end piece and both said parts being made of tightly closed casings to form water jackets. The longitudinal jackets 11 are preferably each composed of two or more sections of substantially rectangular cross section. The cross piece 12 is a single hollow body having a central arched recess 13 at the bottom to serve as the opening leading into the fire box and to be closed as usual by doors. This opening, as with that of the brick arches, has its side walls 14 and upper wall 15 arched, by making its side walls and top slanting as best shown in perspective in Fig. 5. The sections of the side jackets 11 are made to communicate with one another and with the end parts of the cross piece 12 by suitable means, as, for instance, hollow push nipples 16, and are joined together by screw bolts, as at 17. The jackets are connected to the water space of the boiler and steam or water system by a system of pipes 18, so that the water will circulate through the jackets 11 and 12 of the fire box and produce the effect stated. It will be seen that by my invention a boiler of the old type in use in apartment houses or the like can be saved with comparatively small expense.

To increase the heating capacity of the jackets, the inner surfaces of the side parts are corrugated as at 19.

As a safety means, I provide a fusible plug 20 in the upper end of the slanting wall 15, so that when there is no water in the boiler the fuse will burn out and this will indicate to the attendant that the boiler must be filled.

The side parts of the jackets may have brass plugs 21 for cleaning purposes.

What I claim is:—

1. As an article of manufacture, a metal fire box adapted for installation in an old steam boiler in lieu of the brick fire box thereof, said metal fire box consisting of a hollow end jacket having a recess to form an arch, and hollow side jackets separably connected to said end jacket and each composed of separable sections communicating with one another and with said end jacket.

2. As an article of manufacture, a metal fire box adapted for installation in an old steam boiler in lieu of the brick firebox thereof, said metal firebox consisting of a hollow end jacket having a recess whose walls are slanting inwardly to form an arch, and two hollow side jackets separably connected to said end jacket and each composed of separable sections communicating with one another and with said end jacket, and a system of pipes for connecting said firebox to the water space of said steam boiler.

3. As an article of manufacture, a metal fire box for installation in an old steam boiler in lieu of the brick fire box thereof, said metal fire box consisting of an end hollow water jacket formed to an arch and hollow side water jackets separably connected to the inner ends of said end water jacket and each composed of separable sections communicating with one another and with said end water jacket.

In testimony whereof I affix my signature.

LEWIS GLASHOW.